Sept. 7, 1937.  B. L. QUARNSTROM  2,092,018
METHOD OF MAKING TUBES AND COPPER COATING PROCESS
Filed June 21, 1934   2 Sheets-Sheet 1
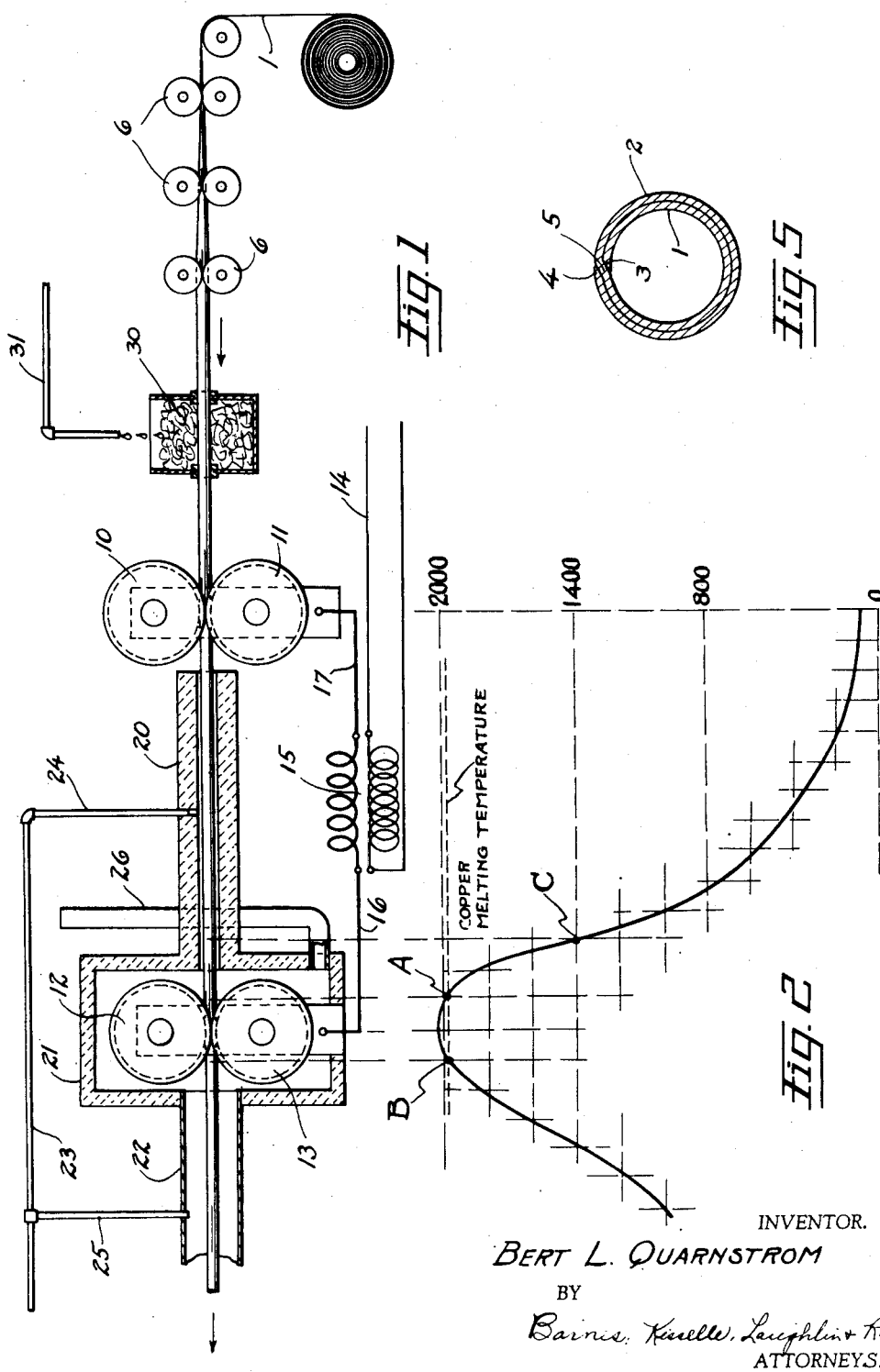
INVENTOR.
BERT L. QUARNSTROM
BY
Barnes, Kisselle, Laughlin & Reed
ATTORNEYS.

Sept. 7, 1937. B. L. QUARNSTROM 2,092,018
METHOD OF MAKING TUBES AND COPPER COATING PROCESS
Filed June 21, 1934 2 Sheets-Sheet 2

INVENTOR.
BERT L. QUARNSTROM
BY
Barnes, Kisselle, Laughlin & Raisch
ATTORNEYS.

Patented Sept. 7, 1937

2,092,018

UNITED STATES PATENT OFFICE 2,092,018

METHOD OF MAKING TUBES AND COPPER COATING PROCESS

Bert L. Quarnstrom, Detroit, Mich., assignor to Bundy Tubing Company, Detroit, Mich., a corporation of Michigan Application June 21, 1934, Serial No. 731,723

20 Claims. (Cl. 219—12)

This invention relates to a process for affixing a copper coating to ferrous metal stock and to a copper welding or copper brazing process. The invention is particularly useful in the making of tubing fashioned from copper-coated strip ferrous stock wherein the copper serves to unite or weld together overlapping or contacting portions of the strip, and where a copper coating on the finished tube is desired.

The invention is applicable to the maintaining of a copper coating on articles other than the tubing. For instance it may be employed where it is desired to heat treat a copper-coated wire or strip of metal where the heat treating temperature exceeds copper melting temperature, thus to preserve the copper coating. Also it may be desirable, with some such articles, to melt the electro-plated copper coating for the purpose of affixing it to the underlying ferrous metal by reason of the molten copper alloying therewith. And in such a case the copper coating is maintained and at the same time alloyed to the underlying ferrous metal.

For the purpose of making further specific disclosure of the invention, reference will be made to the making of tube as exemplary of other articles. In the making of such a tube one or more strips of ferrous stock may be coated with copper on one or both sides. The copper coating may be applied by different processes as for example by the electro-deposition process. The strip is then fashioned into tube form having overlapping parts and/or fashioned to provide a tube with plural ply walls. Then such a tube is subjected to heat sufficient to melt the copper. The overlapping parts or plies are, upon cooling, united by the copper. This is sometimes called "copper welding" and sometimes called "copper brazing" and the process is usually carried out under conditions precluding oxygen and to this end a non-oxidizing or reducing gas surrounds the tube while the same is heated.

The present invention is directed particularly toward the making of a tube of this nature wherein the tube is heated by electrical resistance. In other words, a current of electricity usually of low voltage and high amperage is passed through the metal of the tube, and the tube acts as a resistance element and becomes heated. Various difficulties present themselves in the making of such a tube by the electrical resistance method, particularly where it is desired that the finished tube has a coating of copper on its outside or inside surfaces or both. This invention is directed to certain improvements for rectifying and overcoming the such difficulties.

In the accompanying drawings:

Fig. 1 is a somewhat diagrammatic illustration of an apparatus for making a copper-coated tube fashioned from strip stock.

Fig. 2 illustrates a temperature curve to show the temperature of the tube as the same moves lengthwise through the heat treating apparatus.

Fig. 5 is a cross sectional view of a tube which may be made in accordance with this invention.

Figure 3:
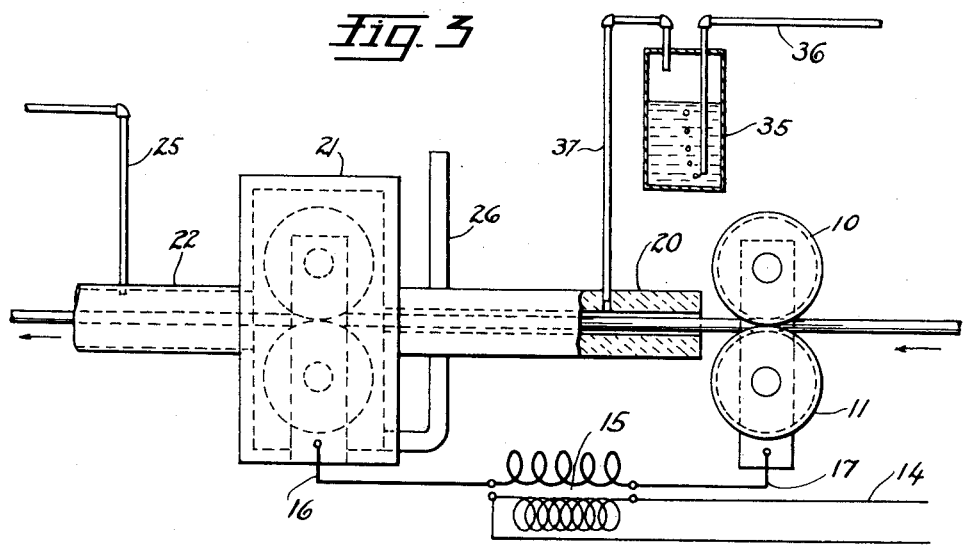
Fig. 3 is a diagrammatic view similar to Fig. 1 showing a modified form of the invention.

The tube as illustrated in Fig. 5 is what has now become known in the trade as "Bundy" tube, fashioned from a strip of stock 1 preferably of ferrous metal such as low carbon steel, into a plural ply tube structure having an inner ply 1 and an outer ply 2. The edges of the stock as at 3 and 4 substantially meet an offset 5 in the stock. The stock 1 may be plated with copper on one side or both sides before it is fashioned into tube. The stock may be run through a suitable tube forming machine having tube forming rollers as 6 for fashioning the tube. Such a machine is well-known to those versed in the art and the diagrammatic showing in Fig. 1 will suffice for the purpose of the disclosure herein.

The tube forming machine may be lined up with the heating apparatus so that the tube is fed directly from the machine into the heating apparatus. However, this lining of the tube forming and heating apparatus is not essential as the tubes may be first formed and later subjected to the heat treatment. The heating apparatus as shown herein comprises, electrodes 10 and 11 through which the tube passes and another pair of electrodes 12 and 13 axially removed from the rollers 10 and 11 and forward thereof and through which the tube passes. While the electrodes are shown as rollers they may be of an immovable type such as dies or brushes. A primary power line as illustrated at 14 and a suitable transformer is shown at 15, and the secondary circuit is connected to the sets of roller electrodes as at 16 and 17. It will be observed therefore that the circuit of the secondary runs through the length of the tube between the two sets of rollers. The arrangement is such that the tube is heated to a point where the copper coating becomes molten.

The heat treatment takes place under conditions precluding the presence of oxygen and to this end the tube may be housed in a muffle 20 the entrance end of which is preferably adjacent the electrodes 10 and 11, and the muffle connects into a chamber 21 housing the electrodes 12 and 13, the chamber in turn connecting into a cooler 22. The tube moves successively through the muffle, chamber, and the cooler. A suitable reducing or non-oxidizing gas may be supplied through the piping 23 which has a branch 24 leading into the muffle and a branch 25 leading into the cooler. The enclosure may be provided with a flue 26.

As has heretofore been proposed to make such a tube, by passing electrical current through the tube to heat the same, the copper coating was not satisfactorily maintained. The electrodes 12 and 13 contact with the tube at the time the copper is molten. This spoils the smoothness and uniformity of the coating. In addition to this, the coating has been bad due apparently to improper control of such factors as the temperature to which the tube is subjected, the time period of the heat treatment and the condition of the reducing or non-oxidizing gases surrounding the tube during the heat treatment. Moreover when alternating current is used interruptions or lines appear in the copper coating indicating the alternate directions of the current, these interruptions being spaced lengthwise of the tube at dimensions depending on the speed of the tube as related to the rate of electrical cycle.

The present invention overcomes these difficulties and objections. In accordance with the invention the copper-coated surfaces of the tube are covered with a film of carbon. This film of carbon functions to hold the copper in place on the exposed surfaces of the tubing while in a molten condition and prevents the molten copper from running or migrating or collecting in pools or spots. Just why this action takes place I am not prepared to say definitely, but one possible explanation is that the carbon breaks down or minimizes the surface tension of the molten copper. Also the carbon deposit eliminates unsatisfactory conditions of the coating due to the electrodes 12 and 13 contacting therewith and due to the use of alternating current.

One way of carrying out the invention is illustrated in Fig. 1 wherein a suitable fluid, which decomposes when heated in the non-oxidizing atmosphere and deposits a film of carbon on the tube preferably prior to the time the tube reaches copper melting temperature, is applied to the tube. Such a fluid may be mineral oil or a vegetable or animal fat carrying carbonaceous matter. The tube may be run through a body of absorbent material 30 kept moistened with the oil or other fluid by means of the same dripping from a supply pipe 31. Thus the tube is nicely and uniformly coated with the oil. As the temperature rises in the muffle, this oil or carrier with its carbonaceous content decomposes and deposits carbon upon the tube. By reference to Fig. 2 it will be noted that the copper is melted substantially from point A to the point B. The oil or other liquid preferably decomposes into its various constituents at temperatures lower than the melting point of copper as for example in the zone between points A and C. Thus carbon film is deposited upon the exposed surfaces of the copper-coated ferrous stock. The presence of this carbon holds the molten copper coating in place on the ferrous stock and prevents the coating from running, shifting, or collecting in pools or spots. It also eliminates any irregular appearance due to the contact of the molten copper with the electrodes and also eliminates the interrupted appearance due to the use of alternating current. As the result, the overlapping parts of the tube are effectively welded together and the copper coating is maintained intact. The tube preferably is cooled while in a reducing or non-oxidizing atmosphere by running through a cooler 22 and as it comes out of the cooler the copper coating is bright, smooth, substantially uniform and free of oxides.

The reducing or non-oxidizing gas supplied through the line 23 may be hydrogen or a gas of lower reducting properties such a gas known as electrolene which is produced by the cracking of ordinary illuminating gas.

Figure 4:
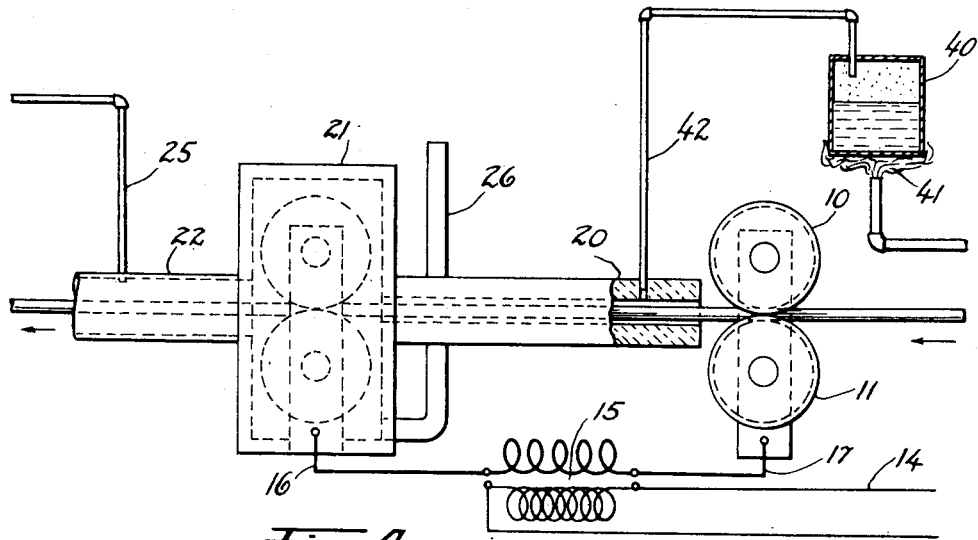
Fig. 4 is a diagrammatic view similar to Fig. 1 showing a still further modified form of the invention.

A modified form of the invention resides in introducing a gas into the muffle which gas will decompose in the heat therein and deposit a film of carbon upon the tube. For this purpose ordinary illuminating gas may be used but its carbon producing qualities may be increased by the use of methanol, alcohol, oil or commercial lacquer thinner which may contain chamel alcohol. To this end a quantity of any one of the above substances may be placed in a container 35 and illuminating gas may be supplied thereto by a pipe line 36. The gas bubbles through the liquid and passes from the container through a pipe line 37 where it is introduced into the muffle. The gas evaporates or absorbs some of the liquid and carries the same into the muffle. The gas decomposes under heat and under conditions precluding oxides with the result that a film of carbon is deposited upon the tube. A further modification resides in introducing vaporized oil into the muffle. This is illustrated in Fig. 4 where oil in a container 40 is vaporized by heat as for example a flame 41 and the vapors pass through pipe line 42 and are introduced into the muffle. This vaporized oil decomposes and deposits a carbon film upon the tube which acts in the manner as above described.

In the forms as shown in Figs. 3 and 4 a separate non-oxidizing or reducing gas need not be introduced into the muffle since the treated illuminating gas and the vaporized oil serve to produce the non-oxidizing environment. Of course, in the form shown in Fig. 1 the oil decomposes and produces a non-oxidizing environment and the separate non-oxidizing or reducing gas introduced into the muffle may be dispensed with. In the several forms of the invention, the carbon in its nascent form is particularly active and is effective to rapidly de-oxidize the metal of the tube. It is preferred, however, that a non-oxidizing or reducing environment be effectively maintained in the cooler, and to this end the separate gas may be introduced into the cooler in all forms of the invention. This keeps the copper bright and clean and free from oxides until it has been substantially cooled.

In some of the claims appended hereto reference is made to the fact that the exposed copper coating on the finished tube or article is intact. The word "exposed" is employed to differentiate from such surfaces which are in a seam or the surfaces between adjoining plies. The copper readily fills in the joints, seams, or in-between plies and by describing the surfaces as "exposed" I mean to include such surfaces as are on the outside or the inside of the tube. The term "overlapping parts" is to be construed to cover abutting or contacting parts.

In the specification and claims copper is the metal referred to which forms the coating and which constitutes the welding or brazing medium. The term "copper" as so used shall be construed as covering cuprous metal, such as for example, an alloy of copper and one or more other metals.

I claim:

1. The method of affixing a copper coating to strip ferrous stock which comprises moving the copper-coated stock lengthwise through spaced electrodes and in a non-oxidizing atmosphere whereby electrical current is passed through successive sections of the stock to melt the copper coating, introducing a substance in proximity to the stock which decomposes in the heat and deposits a film of carbon over the copper surfaces to hold the copper in place upon the ferrous metal while in a molten condition.

2. The method of affixing a copper coating to strip ferrous stock which comprises moving the copper-coated stock lengthwise through spaced electrodes and in a non-oxidizing atmosphere whereby electrical current is passed through successive sections of the stock to melt the copper coating, and whereby electrodes may contact with the molten copper, introducing a substance in proximity to the stock which decomposes in the heat and deposits a film of carbon upon the copper to hold the molten copper in place upon the stock and to eliminate imperfections therein due to contact of electrodes with the molten copper, whereby the copper coating on the stock is substantially uniform when the same is cooled.

3. The method of affixing a copper coating to strip ferrous stock which comprises passing copper-coated stock lengthwise through spaced electrodes and in a non-oxidizing atmosphere to pass alternating current through successive sections thereof to melt the copper coating and wherein electrodes may contact with the molten copper, introducing a substance in proximity to the stock which decomposes in the heat and deposits a film of carbon upon the copper to hold the copper in place while in a molten condition and to eliminate imperfections in the copper coating due to contact with the same while the copper is molten and due to alternating current, whereby upon cooling the copper coating substantially uniformly covers the ferrous stock.

4. The method of treating a long length of copper-coated ferrous metal which comprises, passing the same lengthwise through spaced electrodes and in a non-oxidizing atmosphere whereby electric current is passed through successive sections of the length of ferrous metal to heat the same to copper melting temperature, applying a film of carbon over the exposed copper surfaces to hold the coating in place upon the ferrous metal while the same is molten and to eliminate imperfections therein due to contact with electrodes and then cooling the length of coated ferrous metal with the coating intact and substantially free of imperfections.

5. The method of treating a long length of copper-coated ferrous metal which comprises, passing the same lengthwise through spaced electrodes and in a non-oxidizing atmosphere whereby alternating current is passed through successive sections of the length of ferrous metal to heat the same to copper melting temperature applying a film of carbon over the exposed copper surfaces to hold the coating in place upon the ferrous metal while the same is molten and to eliminate imperfections therein due to the alternating current and then cooling the length of coated ferrous metal with the coating intact and substantially free of imperfections.

6. The method of making tube from copper-coated strip ferrous stock which comprises, fashioning the stock into tubular form with overlapping parts, passing electric current longitudinally through the tube while in a non-oxidizing atmosphere to heat the same to copper melting temperature, introducing a substance in proximity to the heated tube which substance decomposes into some of its constituents in the heat and deposits a film of carbon on the copper surfaces to hold the copper coating in place while the copper is in a molten condition and then cooling the tube to copper weld the overlapping parts together and with the copper coating intact.

7. The method of making tube from copper-coated strip ferrous stock which comprises, fashioning the stock into tubular form with overlapping parts, passing the tube lengthwise through axially spaced electrodes whereby electric current is passed through portions of the tube between the electrodes to heat said portions to copper melting temperature, maintaining a non-oxidizing environment around the tube while the same is heated, introducing a substance in proximity to the heated tube which decomposes into some of its constituents in the heat to deposit a film of carbon upon the exposed copper surfaces to hold the copper coating in place while molten, and then cooling the tube to copper weld the overlapping parts together and with the exposed copper coating intact.

8. The method of making tube from copper-coated strip ferrous stock which comprises, fashioning the stock into tubular form with overlapping parts, passing the tube lengthwise through axially spaced electrodes whereby electric current is passed through portions of the tube between the electrodes to heat said portions to copper melting temperature, maintaining a non-oxidizing environment around the tube while the same is heated, introducing a substance in proximity to the heated tube which decomposes into some of its constituents in the heat to deposit a film of carbon upon the exposed copper surfaces to hold the copper coating in place while molten, and then cooling the tube while in a non-oxidizing environment to copper weld the overlapping parts together and with the exposed copper coating intact.

9. The method of making tube from copper-coated strip ferrous stock which comprises, fashioning the stock into tubular form with overlapping parts, applying a coating of mineral oil over the surfaces of the tube, passing the tube lengthwise through axially spaced electrodes and through a non-oxidizing atmosphere whereby electric current is passed through successive sections of the tube to heat the same to copper melting temperature, said mineral oil decomposing in the heat to deposit a film of carbon upon the exposed surfaces which serves to hold the copper coating in place while molten and then cooling the tube to copper weld overlapping parts together and with the exposed coating intact.

10. The method of making tube from copper-coated strip ferrous stock which comprises, fashioning the stock into tubular form with overlapping parts, applying a coating of mineral oil over the surfaces of the tube, passing the tube lengthwise through axially spaced electrodes and through a non-oxidizing atmosphere whereby electric current is passed through successi\ sections of the tube to heat the same to copper melting temperature, said mineral oil decomposing in the heat at a temperature below copper melting temperature to deposit a film of carbon upon the exposed surfaces which serves to hold the copper coating in place upon the ferrous metal while molten and then cooling the tube to copper weld overlapping parts together and with the exposed coating intact.

11. The method of making tube from copper-coated strip ferrous stock which comprises, fashioning the stock into tubular form with overlapping parts, applying a liquid vehicle carrying carbonaceous matter to the exposed surfaces of the tube, passing the tube lengthwise through axially spaced electrodes and through a non-oxidizing atmosphere whereby electric current is passed through successive sections of the tube to heat the successive sections to copper melting temperature, said vehicle decomposing in the heat and depositing a film of carbon upon the exposed surfaces to hold the copper coating in place on the ferrous metal while molten and then cooling the tube to copper weld the overlapping parts together and with the exposed copper coating intact.

12. The method of making tube from copper-coated strip ferrous stock which comprises, fashioning the stock into tubular form with overlapping parts, applying a liquid vehicle carrying carbonaceous matter to the exposed surfaces of the tube, passing the tube lengthwise through axially spaced electrodes and through a non-oxidizing atmosphere whereby electric current is passed through successive sections of the tube to heat the successive sections to copper melting temperature, said vehicle decomposing in the heat and at a temperature below that of copper melting temperature and depositing a film of carbon upon the exposed surfaces to hold the copper coating in place on the ferrous metal while molten and then cooling the tube to copper weld the overlapping parts together and with the exposed copper coating intact.

13. The method of making tube from copper-coated strip ferrous stock which comprises, fashioning the stock into tubular form with overlapping parts, passing the tube lengthwise through axially spaced electrodes and through a non-oxidizing atmosphere whereby electric current is passed through successive sections of the tube to heat the same to copper melting temperature, introducing a gas in proximity to the heated sections of the tube which decomposes in the heat to deposit a film of carbon upon the exposed surfaces to hold the exposed copper in place while molten and then cooling the tube to copper weld the overlapping parts together and with the copper coating intact.

14. The method of making tube from copper-coated strip ferrous stock which comprises, fashioning the stock into tubular form with overlapping parts, passing the tube lengthwise through axially spaced electrodes and through a non-oxidizing atmosphere whereby electric current is passed through successive sections of the tube to heat the same to copper melting temperature, introducing a vaporized mineral in proximity to the heated sections of the tube which decomposes in the heat to deposit a film of carbon upon the exposed surfaces to hold the exposed copper in place while molten and then cooling the tube to copper weld the overlapping parts together and with the copper coating intact.

15. The method of making tube from copper-coated strip ferrous stock which comprises, fashioning the stock into tubular form with overlapping parts, passing the tube lengthwise through axially spaced electrodes and through a non-oxidizing atmosphere whereby electric current is passed through successive sections of the tube to heat the same to copper melting temperature, introducing a gaseous or vaporous substance in proximity to the heated sections of the tube and which decomposes in heat below the melting point of copper to deposit a film of carbon upon the exposed surfaces to hold the copper in place while molten and then cooling the tube to copper weld the overlapping parts together and with the copper coating intact.

16. In the method of making tube from copper-coated strip ferrous stock, wherein the stock is fashioned into tubular form with overlapping parts, and wherein the tube is passed lengthwise through spaced electrodes and through a non-oxidizing atmosphere so that electric current is passed through successive sections of the tube to heat the same to copper melting temperature, and wherein the electrodes contact with the molten copper, and wherein the tube is then cooled to copper weld overlapping parts together; the step of introducing a substance in proximity to the heated tube which deposits a film of carbon upon the exposed copper surfaces to eliminate imperfections in the coating due to the electrode contact with the molten copper so that upon cooling the copper coating on the exposed surfaces is substantially free of such imperfections.

17. In the method of making tube from copper-coated strip ferrous stock, wherein the stock is fashioned into tubular form with overlapping parts, and wherein the tube is passed lengthwise through spaced electrodes and through a non-oxidizing atmosphere so that electric current is passed through successive sections of the tube to heat the same to copper melting temperature, and wherein the electrodes contact with the molten copper, and wherein the tube is then cooled to copper weld overlapping parts together; the step of applying a film of carbon to the exposed surfaces to eliminate imperfections in the coating due to the contact of electrodes with the copper coating while in a molten condition so that upon cooling the copper coating remains intact substantially free of such imperfections.

18. In the method of making tube from copper-coated strip ferrous stock, wherein the stock is fashioned into tubular form with overlapping parts, and wherein the tube is passed lengthwise through spaced electrodes and through a non-oxidizing atmosphere so that electric current is passed through successive sections of the tube to heat the same to copper melting temperature, and wherein the tube is then cooled to copper weld overlapping parts together; the step of applying a film of carbon to the exposed surfaces, prior to the copper becoming molten, to eliminate imperfections in the coating due to the contact of electrodes with the copper coating while in a molten condition so that upon cooling the copper coating remains intact substantially free of such imperfections.

19. In the method of making tubing wherein copper-coated ferrous strip stock is fashioned into tube with overlapping parts, wherein the tube is moved lengthwise through spaced electrodes and through a non-oxidizing atmosphere and alternating current is passed through successive sections of the tubing to heat the same to copper melting temperature, and wherein the tubing is then cooled to copper weld the overlapping parts together; the step of applying a film of carbon to the exposed copper surfaces to eliminate imperfections in the copper coating due to contact of electrodes with the copper while molten, and to eliminate interruptions in the coating due to the alternating current, whereby upon cooling of the tube the copper coating remains intact and substantially free of imperfections which may be caused by the electrodes and alternating current.

20. In the method of making tubing wherein copper-coated ferrous strip stock is fashioned into tube with overlapping parts, wherein the tube is moved lengthwise through spaced electrodes and through a non-oxidizing atmosphere and alternating current is passed through successive sections of the tubing to heat the same to copper melting temperature, and wherein the tubing is then cooled to copper weld the overlapping parts together; the step of applying a film of carbon to the exposed copper surfaces before the copper is rendered molten to eliminate imperfections in the copper coating due to contact of electrodes with the copper while molten, and to eliminate interruptions in the coating due to the alternating current, whereby upon cooling of the tube the copper coating remains intact and substantially free of imperfections which may be caused by the electrodes and alternating current.

BERT L. QUARNSTROM.